UNITED STATES PATENT OFFICE.

CLAES RYDEN, OF CRANSTON, RHODE ISLAND, ASSIGNOR, BY MESNE ASSIGNMENTS, TO UNIVERSAL WINDING COMPANY OF BOSTON, MASSACHUSETTS, A CORPORATION OF MASSACHUSETTS.

WINDING-MACHINE.

1,278,757.   Specification of Letters Patent.   Patented Sept. 10, 1918.

Application filed June 8, 1914. Serial No. 843,794.

*To all whom it may concern:*

Be it known that I, CLAES RYDEN, a citizen of the United States, residing at Cranston, in the county of Providence and State of Rhode Island, have invented certain new and useful Improvements in Winding-Machines, of which the following is a specification.

My invention relates to winding machines and consists particularly of improvements in the traverse-mechanism for operating the reciprocating or oscillating traverse-guide which deposits the coils of winding in place. My improvements are especially adapted for use on machines of the type shown and described in an application for patent, Serial No. 748,221, filed by Max Helm on Feb. 13, 1913, and designed particularly for winding electrical coils.

The object of my improvements is to provide a manually-controlled device for disconnecting the guide-traversing means from the power-driven mechanism of the machine, and for operating said traverse-means by hand to adjust the guide to any desired position longitudinally of the winding-spindle.

The manner and means for carrying out the improvements are fully described in the following specification, illustrated by the accompanying drawings, in which like letters of reference designate like parts. In the drawings:—

Fig. 4 is a detail of the driving-pinion of the manually-operable driving-means for the traverse-mechanism.

Figure 1:
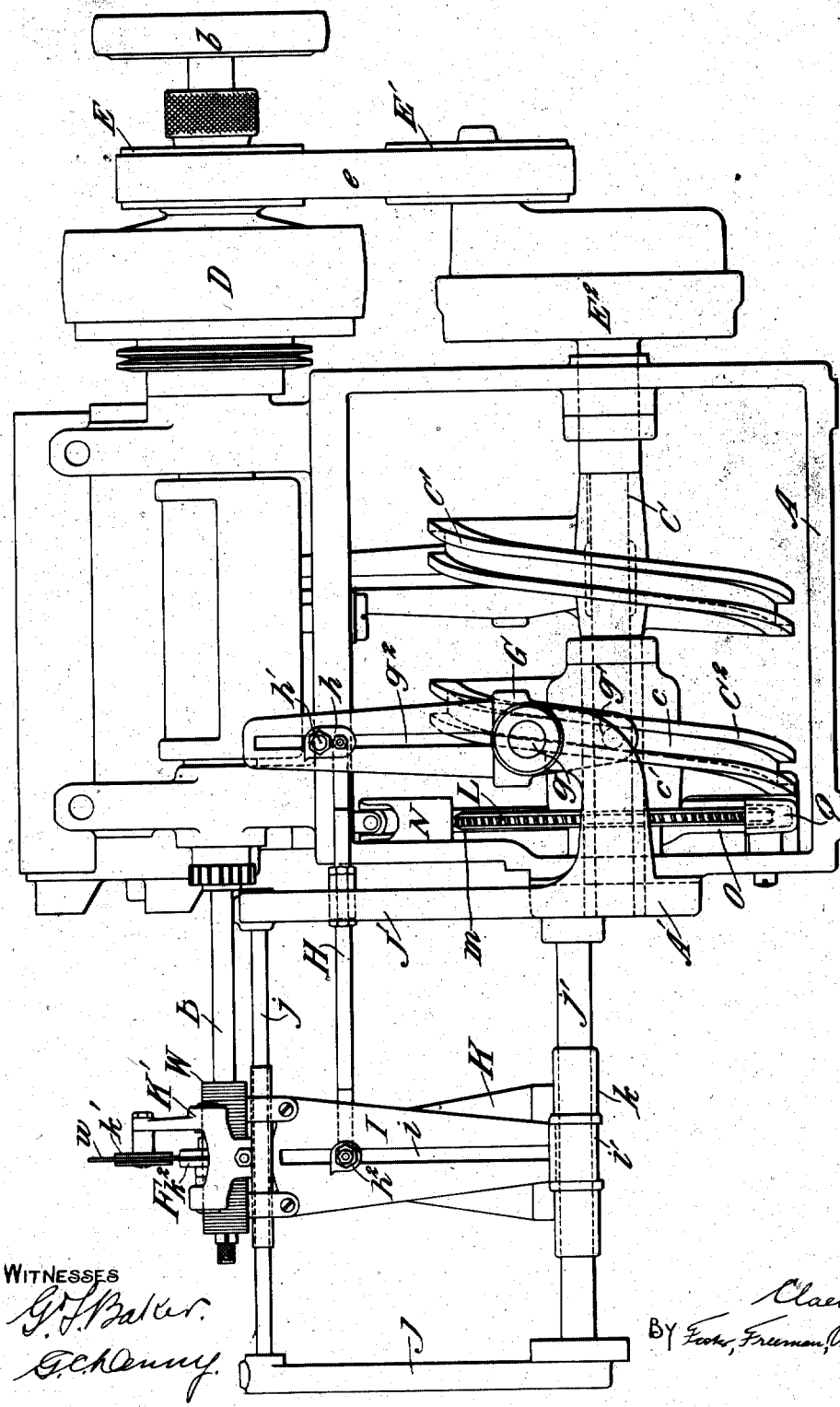
Figure 1 is a side elevation of a winding machine showing the main elements of the traverse-mechanism for reciprocating the traverse-guide.

Referring first to Fig. 1, A designates the main frame of the winding machine in which are provided bearings for a horizontal winding-spindle B and a parallel cam-shaft C. The spindle B overhangs the front of the frame A and is adapted to serve as a rotating mandrel or arbor for receiving the winding W at its forward end. The winding W may be of any usual form or for any purpose as applied in the various arts, but as here shown it consists of a magnet or other electrical coil. At the rear end of the frame A the spindle B carries a belt-pulley D connected thereto by suitable clutch-devices, not here shown, and through which the whole machine is driven from any convenient source of power. The spindle B is arranged to rotate the cam-shaft C through a belt $e$ connecting the pulleys E and E', the latter being mounted on a shaft which drives a train of gearing inclosed within the casing $E^2$. These connections being well known and generally used in the art are not herein shown or described in detail. Suffice to state that when the spindle B is rotated it drives the cam-shaft C at a certain speed in relation thereto as determined by the arrangement of the gearing. At the rear end of the spindle B is a hand-wheel $b$ through which the spindle can be rotated manually in the manner and for the purpose as hereinafter described.

Fixedly secured on the cam-shaft C is a usual form of traverse-cam C' which acts to drive a part of the traverse-devices of the machine in a well known manner as generally used in the art. In machines of the type described in the application for patent hereinbefore referred to, two separate and independent traverse-mechanisms are employed. This style of machine, as before mentioned, is designed for winding electrical coils and these are produced according to the system specified in United States Patent No. 1,080,830 granted to Max Helm Dec. 9, 1913. For this method of winding the machine embodies the use of a plurality of traverse-guides adapted to be reciprocated longitudinally of the winding-spindle and operated simultaneously, but independently of each other. One guide operates to lay the windings of wire or other conducting-material in place on the winding-spindle while one or more other guides deposit windings of insulating-material, such as yarn or thread, among the wire windings. The wire is laid in a close wind in the usual manner of "spool-winding," and the insulating-material is laid in open helices with a diagonal or "cross-wind." The windings of yarn or thread intermingle with the wire windings, crossing over and under the latter at regular intervals, and serve to bind the wire windings in place and assist in insulating one turn from another while also providing insulation between the layers of the coil. The guide or the insulating-material is reciprocated with a quick traverse, while the wire-guide has a relatively slow traverse.

Figure 3:
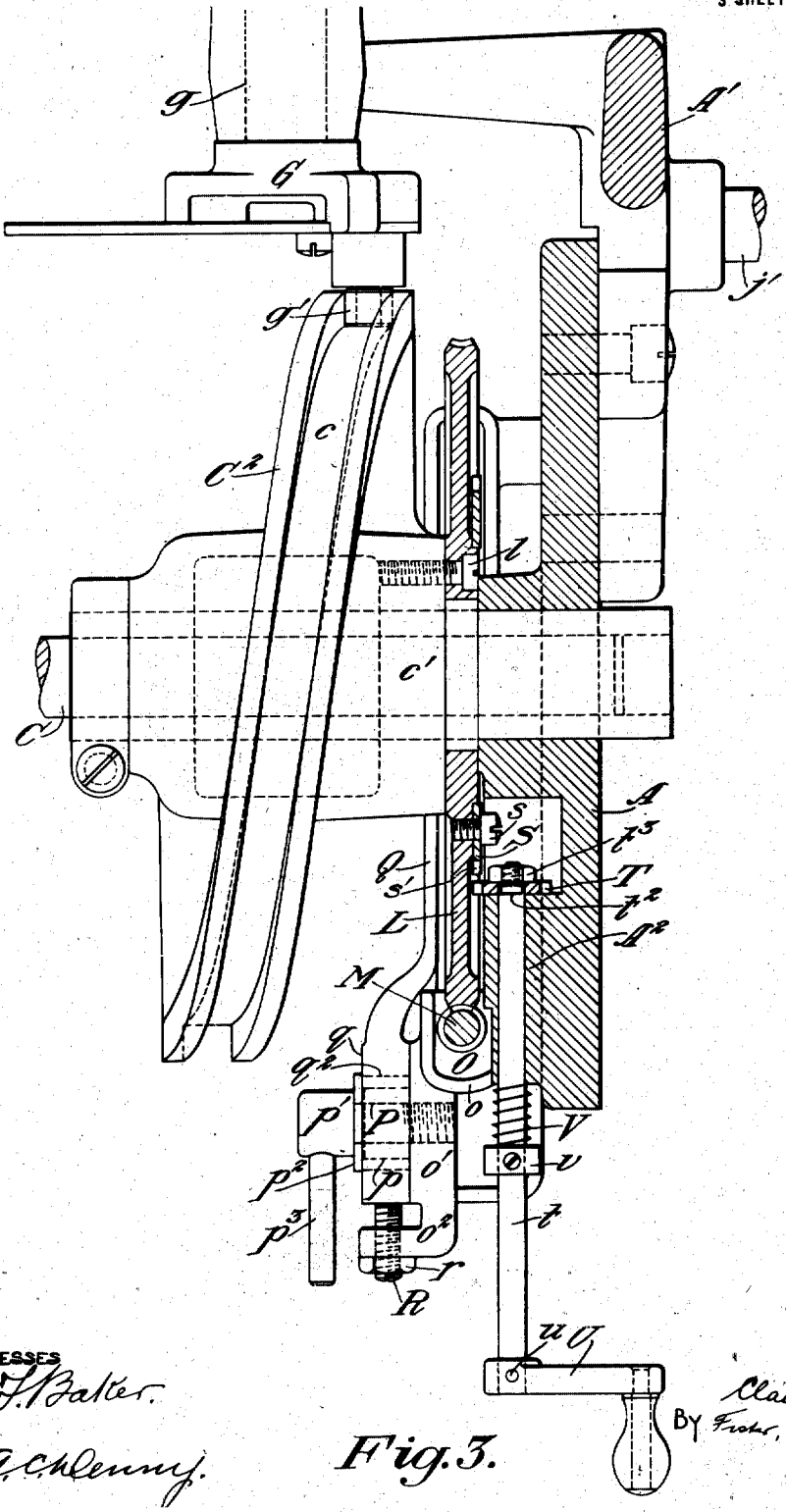
Fig. 3 is a plan view of a portion of the traverse-mechanism of the machine, part sectional on the line X—X of Fig. 2, and illustrating the means for connecting it to be operated manually.

In the accompanying drawings the guide for the yarn or thread is not illustrated since its arrangement forms no part of the present invention. It may be driven in any suitable manner, and a convenient arrangement is to connect it with a rockable arm which is oscillated from the cam $C'$. A second cam $C^2$ is employed for reciprocating the wire-guide F and the means for connecting it thereto are shown in Figs. 1 and 3. The cam $C^2$ is mounted free to rotate on the cam-shaft C, independently thereof, and is driven from a separate means as later described. Reaching in from the side of the frame A is a bracket $A'$, see Figs. 1 and 3, supporting a pivot stud $g$ on which is mounted a rockable arm or lever G. The lever G is arranged adjacent the periphery of the cam $C^2$ and carries a roll or stud $g'$ at its lower end which is adapted to engage with the cam-groove $c$. The upper portion of the lever G is formed with a slot $g^2$ in which is secured a slidable member $h$ held in place by the bolt $h'$. Pivotally connected to the member $h$ at one end is a link or connecting-rod H, the opposite end of which is pivotally secured to a terminal member $h^2$. The member $h^2$ is adapted to be adjusted up and down in a slot $i$ of a vertical arm I. The arm I serves as a cross-head adapted to slide on two parallel horizontal rods $j$, $j'$ which are held in suitable supporting arms J, $J'$. Also arranged to slide on the rod $j'$ is an arm K having its lower end secured to a sleeve $k$ on which is mounted the bearing $i'$ of the arm I. The arm K carries a bracket $K'$ at its upper end on which are provided bearings for two rotatable guide-wheels or pulleys $k'$, $k^2$. The wire $w$ or other material being wound leads from its source of supply, not here shown, down under the pulley $k'$ and thence over and partly around the grooved periphery of the guide-wheel $k^2$, whence it is delivered to the winding-spindle B. Rotation of the cam $C^2$ acts through the roll $g'$ to rock the lever G and this motion is transmitted through the connecting-rod H to reciprocate the arm I back and forth on the rods $j$, $j'$. The traverse-guide arm K being connected to the arm I at its base is therefore caused to traverse back and forth along the winding-spindle B to lay the turns of the winding in place in the usual manner. The length of traverse of the guide is determined by the operative length of the lever G and this may be varied as required by adjusting the connecting-members at the ends of the rod H up or down in the slots $g^2$ and $i$. The guide for the yarn or other insulating-material may be connected to be driven from the cam $C'$ in substantially the same manner as above described, and in this way the length of traverse of both guides can be altered as required without the need of substituting additional cams of different throw.

Figure 2:
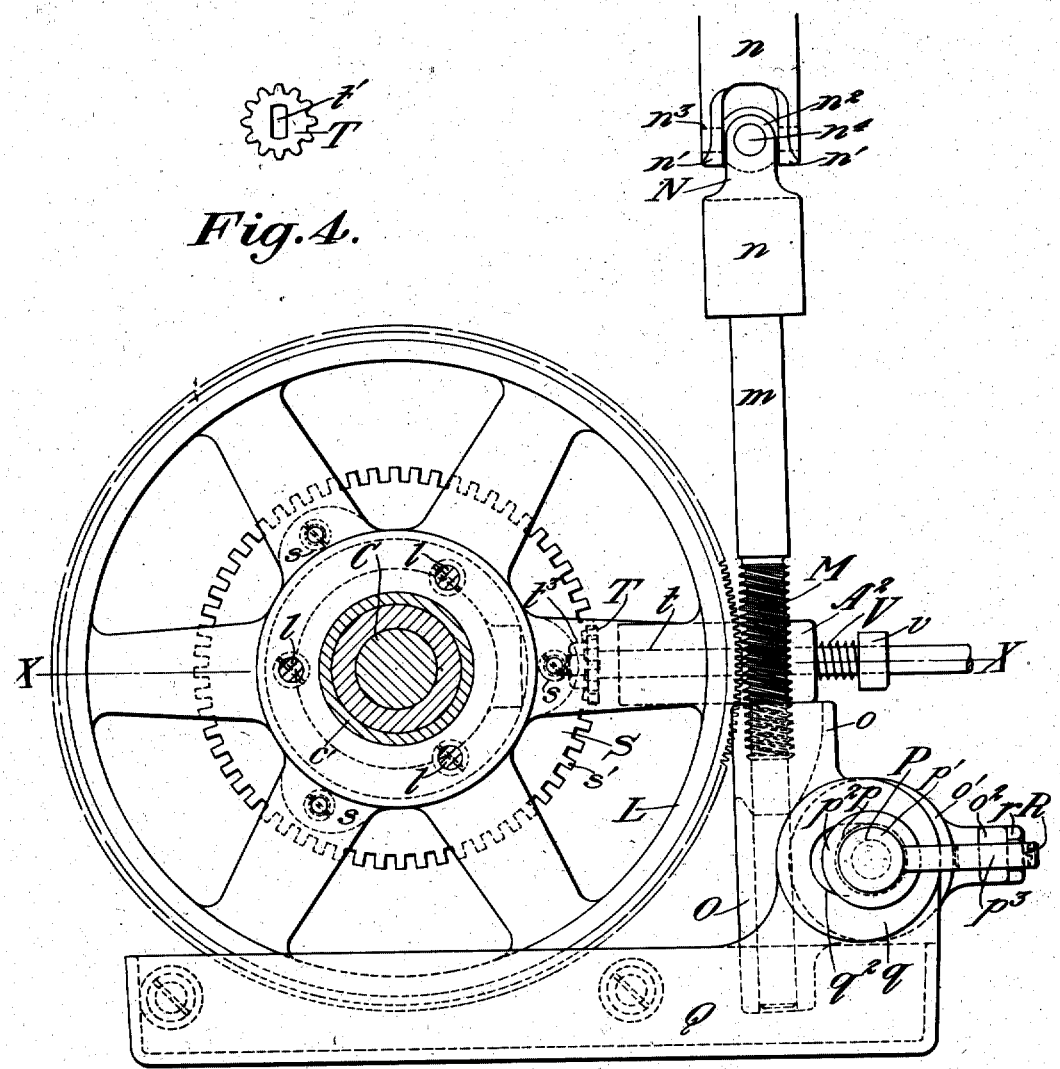
Fig. 2 is an enlarged view of a portion of the power-actuated driving-means for the traverse-mechanism showing the manner of disconnecting it therefrom.

As before mentioned, the cam $C^2$ is rotated through means independent of the cam-shaft C which drives the cam $C'$, and, since the rotation of the cam $C^2$ is at a relatively slow speed, a convenient means for driving it is through the use of worm gearing. Referring particularly to Figs. 2 and 3, a worm-wheel or gear L is here shown attached to the end of the hub $c'$ of the cam $C^2$ by means of the screws $l$, $l$. Adapted to mesh with the teeth of the gear L is a worm M which is illustrated in Fig. 2 as being formed as a part of a vertical shaft $m$. The shaft $m$ may be driven through any suitable means as, for instance, a connection with the winding-spindle B, but these connections are not herein shown or described as they form no part of the present invention. In my United States Patent No. 1,089,793, granted Mar. 10, 1914, there is shown and described a variable-speed device for driving the wire-guide cam $C^2$ from the spindle B through the vertical shaft which carries the worm meshing with the gear on the hub of the cam. This or any other similar arrangement might be employed in connection with the present invention. In some cases, a train of spur gears connected to drive bevel-pinions are used to rotate the vertical shaft $m$, but, as before stated, the arrangement of this part of the mechanism of the machine is not material to the present subject matter.

A simple and convenient method for disconnecting the cam $C^2$ from its driving means is to adapt the worm M to be thrown out from engagement with the worm-gear L. In my present improvement this is provided for by articulating the shaft $m$ with a knuckle or joint at N, as shown in Fig. 2. This may be of any appropriate form such as the well known type of universal joint here illustrated consisting of two parts $n$, $n$ having opposite lugs $n'$, $n'$ and $n^2$, $n^2$ which serve as bearings for the connected cross-pins or trunnions $n^3$, $n^4$.

To provide for holding the shaft $m$ in position with the worm M in mesh with the gear L its lower end is stepped in a bearing O which is adjustable toward and away from the axis of the shaft C. Preferably, the bearing O is constructed with a flaring cup-shaped flange $o$ at its upper end which provides an oil-pocket or guard for the worm M adapted to take the drip from the worm-wheel or gear L. The worm and gear are lubricated from oil carried up by the teeth of the gear which pass through a reservoir Q arranged below, and the excess of lubricant is then caught by the flange $o$ and drained down to oil the bearing O. Extending from the side of the bearing O is a circular lug $o'$ adapted to be secured to a similarly-shaped disk-like ear $q$ which is formed as a part of the oil-reservoir Q. The ear $q$, it will be understood, bears a fixed relation to the bearings of the cam-shaft C, since the oil-reservoir Q either forms a part of the main frame A of the machine or is attached rigidly thereto as shown in Fig. 1. A cross-slot $q^2$ extends through the ear $q$, and fitted to turn therein is a roll $p$. The roll $p$ is mounted to rotate on a stud P which is screwed into the lug $o'$ of the bearing O. The stud P is formed with a head $p'$ between which and the face of the ear $q$ is a washer $p^2$, while a pin $p^3$ driven through the head $p'$ serves as a finger-lever for turning the stud, see Fig. 3. By loosening the stud P the bearing O can be slid back and forth to carry the worm M into and out of engagement with the gear L as the roll $p$ slides into the slot $q^2$. Formed on the outer end of the lug $o'$ is a finger $o^2$ through which is threaded a stud R provided with a check-nut $r$. The stud R is adjusted in the finger $o^2$ so that when the worm M is properly meshed with the teeth on the gear L the end of the stud will strike against the edge of the ear $q$. In this way the stud R acts as a detent or check to limit the inward movement of the bearing O so as to provide for the proper setting of the worm in relation to the gear. After the bearing O is thus adjusted to bring the worm and gear in mesh it is held in position by binding the lug $o'$ against the ear $q$ through the tightening of the stud P.

For turning the cam $C^2$ by hand, after the power-actuated driving-means have been disconnected therefrom, manually-operable devices are provided as follows: Referring to Figs. 2 and 3, a gear-wheel S is secured to the hub of the worm-gear L by means of the screws $s$. The gear S is here shown as constructed of sheet-metal stamped out with spur-teeth $s'$ on its periphery. It is obvious, however, that a bevel-gear could be employed in its place for the same purpose and it might be constructed as an integral part of the hub of the worm-gear L. Formed on the inside of the frame A of the machine or attached thereto is a bearing $A^2$ through which extends a rotatable shaft $t$. On the inner end of the shaft $t$ is a pinion T adapted to mesh with the teeth of the gear S. Preferably, the pinion T is constructed of sheet-metal in the form of a punching having a rectangular slot $t'$ at its center, as shown more particularly in Fig. 4. The slot $t'$ adapts it to fit onto the squared-off end of the shaft $t$ against a shoulder $t^2$, see Fig. 3, where it is held in place by a nut $t^3$. The shaft $t$ projects some distance beyond the outer end of the bearing $A^2$ and at its extremity carries a crank-handle U held in place by the pin $u$. Between the crank U and the bearing $A^2$ is a collar $v$ which takes the thrust of a spring V held at its opposite end against the end of the bearing. The tendency of the spring V is to slide the shaft $t$ outwardly in its bearing $A^2$ to maintain the pinion T disengaged from the gear S. The tension of the spring V is relatively slight, however, and therefore the shaft $t$ can be easily slid inwardly by pressing on the crank U, so that in this manner the pinion T and gear S are brought into mesh to rotate the cam $C^2$ through the turning of the crank. Having now described the construction and arrangement of the various parts of the device its method of operation will next be explained:

Before starting to wind the coil on the spindle B it is desirable to bring the wire-guide F to the extreme limit of its traverse so that the winding will commence at one end of the coil. This insures the winding of a complete layer at the first traverse of the guide and also provides for leaving the end of the wire projecting from the end of the coil to be used as a "lead" for connecting it to the apparatus with which the coil is used. If the machine does not happen to stop with the guide at the end of its traverse, the operator proceeds as follows before starting to wind a new coil: The hand-lever or pin $p^3$ is first turned to release the stud P and the bearing O is then drawn forward to disengage the driving-worm M from the cam-gear L. The shaft $t$ is then pushed inwardly against the action of the spring V to carry the pinion T into mesh with the gear S, and by turning the crank U the pinion T will act to rotate the gear S and thereby the cam $C^2$. The rotation of the cam $C^2$ will now act to traverse the guide F to the extent required to bring it to the end of its throw. After the guide F has been thus adjusted to its proper position as required, the bearing O is pushed back and clamped into place with the worm M again engaging the gear L. When the wire $w$ has been threaded through the guide-wheels $k'$, $k^2$ and its end attached to the spindle B, or to the core on which the winding is to be built up, the machine is ready for operation and can be started under power.

It is usual in machines of this type to provide registering-devices for counting the turns of wire wound into each coil and for automatically arresting the winding after the desired number of turns has been reached. With such arrangements it is impracticable to control the winding-mechanism so as to stop the guide at the completion of any one layer of winding and therefore the machine will almost invariably stop with the guide some distance away from the end of the coil. Now, in order to properly secure the free end of the wire to the end of the finished coil, so that it can be used as a "lead", it is usual to wind it about the coil with a few extra turns, thereby bringing it to the point where it is to be fastened by solder. Heretofore it has been necessary to perform this operation of winding the wire out to the end of the coil by hand, after the coil has been taken off the winding-spindle or arbor. With my present improvement the operation may be accomplished on the machine before the coil is removed therefrom and hence the work can be done much more conveniently and expeditiously. After the machine stops upon the completion of the number of turns of winding for which the registering-device is set the operator simply disconnects the driving-devices from the cam $C^2$ and turns the latter through the crank U as before explained. This serves to carry the guide F along the spindle B to finish its traverse in the direction in which it was last moving, and in the meantime the winding-spindle is turned slowly by hand through the wheel $b$. The turning of the spindle serves to wind up the wire with a relatively few, openly-spaced windings until it reaches the end of the coil, after which it is severed from the supply and secured in place in the usual manner. It will be understood that were the spindle to be turned by hand to wind up the wire without disconnecting the traverse-means and operating the latter manually it would usually require a large number of rotations to bring the guide to the end of its traverse. That is to say, even when the machine is operating under power the wire-guide F has a very slow rate of movement so as to lay the turns of winding close together and this movement would be much slower if the spindle were turned by hand. For this reason it would require too long a time to depend on the manual rotation of the spindle for carrying the guide to the end of its traverse, and therefore I have provided the means for operating the traverse-mechanism by hand, independently of the rotation of the spindle, as above described. In this way the whole machine is rendered more practical in use and its operation made more convenient and economical.

It is to be understood that my improvements are applicable to winding machines of different construction and arrangement from that here shown and they might be employed for other uses besides that herein specified. Various modifications might also be made in the form and construction of the mechanism for carrying out the improvement without departing from the spirit or scope of the invention; therefore, without limiting myself to the exact embodiment shown and described, what I claim is:—

1. In a winding machine, the combination with a winding spindle and traverse-guide, of a cam for reciprocating the guide, a worm-gear rotatable with said cam, a worm for driving said gear, means for connecting said worm to be driven from the winding-spindle, means for disconnecting the worm from driving engagement with the worm-gear, a second gear fast with the worm-gear to rotate therewith, a pinion for driving said second gear to turn the worm-gear, means for shifting said pinion into and out of mesh with its gear, and manually-operable means for rotating the pinion.

2. In a winding machine, the combination with a rotating winding-spindle and reciprocating traverse-guide, of a cam for reciprocating the guide, a worm-gear for rotating the cam, a shaft connected to be rotated from the spindle, a worm engaging the worm-gear, a universal joint connecting the worm with the shaft, manually-operable means for disconnecting the worm from driving engagement with the worm-gear, a second gear carried by the worm-gear, a pinion engageable therewith to rotate the worm-gear, a crank to rotate the pinion, and means for normally holding said pinion disengaged from its gear.

3. In a winding machine, the combination with a winding-spindle and traverse-guide, of a cam for reciprocating said guide, a worm-gear for driving said cam, a shaft driven from the winding-spindle, a worm on said shaft, means for manually adjusting said shaft to carry the worm into and out of mesh with the worm-gear, an auxiliary train of gearing for turning the worm-gear after the worm has been disengaged therefrom, and manually operable means for driving said auxiliary gearing to rotate the cam to adjust the position of the traverse-guide.

4. In a winding machine, the combination with a winding-spindle and a reciprocating traverse-guide, of means for traversing said guide, a worm-gear connected to operate the traversing-means, an articulated shaft having its parts connected by a universal joint, a worm on said shaft adapted to mesh with the worm-gear, a shiftable bearing for the end of the worm-shaft, adjustable means for limiting the movement of the bearing to regulate the engagement of the worm with the worm-gear, and means to clamp the bearing in position with the worm in mesh with the worm gear.

5. In a winding machine, the combination with a winding-spindle and reciprocating traverse-guide, of means for traversing the guide, a worm-gear connected to operate the traversing-means, a worm for driving said gear, means for adjusting said worm into and out of mesh with the gear, a second gear fast with the worm-gear, a crank-shaft, a pinion on said crank-shaft adapted to mesh with the second gear, and means to normally maintain the pinion disengaged from its gear while allowing for manual adjustment thereof to provide for operating the traversing-means from the crank-shaft.

6. In a winding machine, the combination with a winding-spindle and traverse-guide, of means for traversing the guide, a worm-gear connected to drive the traversing means, a second gear fast with the worm-gear, a worm rotated from the spindle to drive the worm-gear, a crank-shaft, a pinion on said crank-shaft adapted to be engaged with the second gear, and a spring for sliding the crank-shaft to normally hold the pinion disengaged from its gear.

In testimony whereof I affix my signature in presence of two witnesses.

CLAES RYDEN.

Witnesses:
ARTHUR A. ARMINGTON,
HERBERT K. ALLARD.